US007020191B2

(12) United States Patent
Nyu

(10) Patent No.: US 7,020,191 B2
(45) Date of Patent: Mar. 28, 2006

(54) NETWORK DEVICE AND METHOD FOR DETECTING A LINK FAILURE WHICH WOULD CAUSE NETWORK TO REMAIN IN A PERSISTENT STATE

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 891 days.

(21) Appl. No.: 09/983,168

(22) Filed: Oct. 23, 2001

(65) Prior Publication Data

US 2002/0049933 A1 Apr. 25, 2002

(30) Foreign Application Priority Data

Oct. 24, 2000 (JP) .............................. 2000-323593

(51) Int. Cl.
*H04B 17/00* (2006.01)
(52) U.S. Cl. ...................... 375/224; 375/340; 370/228; 370/443; 370/462; 710/107; 710/305; 710/129
(58) Field of Classification Search ................ 375/224, 375/340; 714/43; 370/228, 443, 462; 710/107, 710/305, 129
See application file for complete search history.

(56) References Cited

U.S. PATENT DOCUMENTS

| 5,115,199 A | * | 5/1992 | Yamagishi .................. 324/533 |
| 5,859,985 A | | 1/1999 | Gormley et al. ............ 395/287 |
| 6,038,234 A | | 3/2000 | LaFollette et al. .......... 370/433 |
| 2004/0165525 A1 | * | 8/2004 | Burak ........................ 370/228 |
| 2004/0255338 A1 | * | 12/2004 | Agnoli et al. ............... 725/136 |

FOREIGN PATENT DOCUMENTS

EP 0 969 628 A2 1/2000

* cited by examiner

*Primary Examiner*—Stephen Chin
*Assistant Examiner*—Eva Zheng
(74) *Attorney, Agent, or Firm*—Young & Thompson

(57) ABSTRACT

A network device monitors a signal transmitted to a wireless or optical link and a signal received from the link for detecting a bit-by-bit coincidence between them. In response to the detection of the coincidence, the network device determines that the received signal is a copy of the transmitted signal. The network device further monitors its transition states for detecting a predetermined state which would persist indefinitely during a link failure. When the predetermined state and the copy of the transmitted signal are simultaneously detected, the network device discontinues its predetermined state and enters a normal state.

21 Claims, 10 Drawing Sheets

FAULT DETECTOR 40

NETWORK DEVICE AND METHOD FOR DETECTING A LINK FAILURE WHICH WOULD CAUSE NETWORK TO REMAIN IN A PERSISTENT STATE

BACKGROUND OF THE INVENTION

1. Field of the Invention

The present invention relates generally to network devices, and more specifically to a network device and method for detecting a link failure which would cause a network to remain in a persistent state.

2. Description of the Related Art

The high speed transport capability of the IEEE 1394 serial bus network is receiving attentions to promote multimedia communications. According to the IEEE 1394 protocol, asynchronous transfer mode is used for transmission of high-reliability signals and isochronous transfer mode is supported for multimedia applications. In order to allow a wireless or optical link to be used between network devices (or nodes), the IEEE-1394 protocol specifies the use of the 8B10B coding scheme in combination with a scrambler.

If an obstacle is inadvertently placed in the path of wireless signals between sender and receiver nodes, signals transmitted from the sender node are not received by the receiver node, and hence no response returns. This results in a time-out which triggers a Bus Reset process in the sender node. Thus, the sender node restarts an initialization process to arbitrate the parent-childhood relationship with the receiver node to reconfigure the network. However, the signal transmitted during the initialization process fails to reach the receiver node. The sender node thus attempts to arbitrate with its own node, resulting in a failure to reconfigure the network. Again, the sender node restarts the initialization process. As a result, the communication between the sender node and other network nodes is also interrupted. This abnormal condition persists indefinitely. A similar problem occurs in an optical link that interconnects two network nodes.

SUMMARY OF THE INVENTION

It is therefore an object of the present invention to provide a network device and method for detecting a failure in a wireless or optical transmission link which would cause a network to remain in a persistent state.

The object is attained by making a decision that a failure has occurred in a wireless or optical link when a signal received from the link is a copy of a transmitted signal and discontinuing network initialization in response to that decision.

According to a first aspect of the present invention, there is provided a network device for communicating with a remote device, wherein the network device includes a transceiver for transmitting a signal to, and receiving a signal from, the remote device. The network device is characterized by a fault detector for detecting a predetermined state of the network device and a coincidence between the transmitted and received signals indicating that the received signal is a copy of the transmitted signal, and producing a fault indicating signal if the predetermined state and the coincidence are simultaneously detected, and means for removing the predetermined state in response to the fault indicating signal.

According to a second aspect, the present invention provides a fault detector for a network device, comprising a first monitor circuit for detecting a coincidence between a signal transmitted from the network device and a signal received by the network device, the coincidence indicating that the received signal is a copy of the transmitted signal, a second monitor circuit for detecting a predetermined state of the network device which would persist indefinitely during a link failure, and a decision circuit for producing a fault indicating signal if the predetermined state and the coincidence are simultaneously detected by the first and second monitor circuits.

According to a third aspect of the present invention, there is provided a method of communication via a wireless or optical link, comprising the steps of transmitting, from a network device, a signal to and receiving a signal from the link, detecting when the transmitted and received signals coincide with each other, indicating that the received signal is a copy of the transmitted signal, detecting when the network device is in a predetermined state which would persist indefinitely during a link failure, and controlling the network device to change from the predetermined state to a normal state if the predetermined state and the coincidence are simultaneously detected.

BRIEF DESCRIPTION OF THE DRAWINGS

The present invention will be described in detail further with reference to the following drawings, in which.

DETAILED DESCRIPTION

Figure 1:
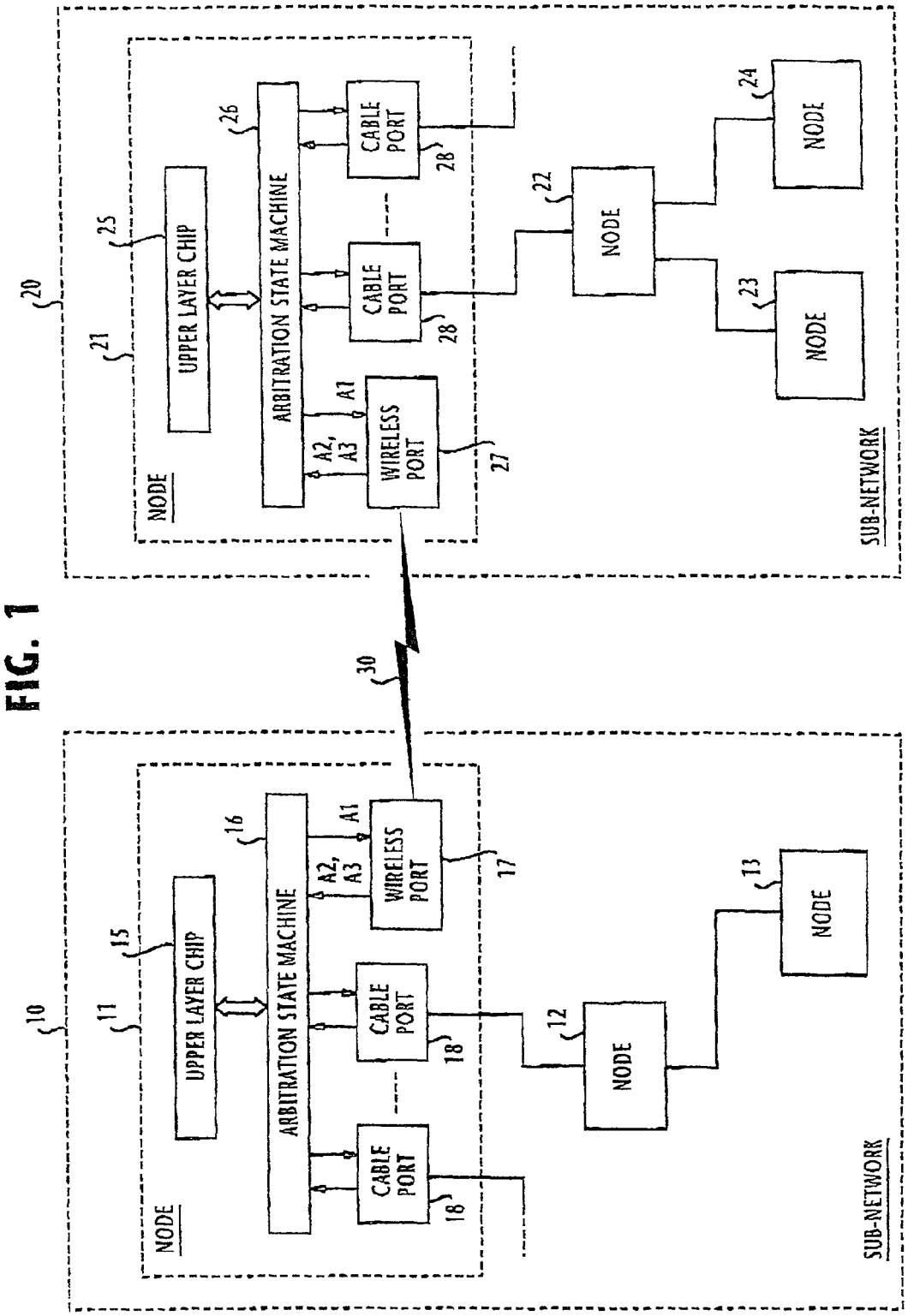
FIG. 1 is a block diagram of a serial bus network according to the present invention.

In FIG. 1, a serial bus network of the present invention is shown in a simplified form as comprising sub-networks 10 and 20 which are interconnected by a wireless link 30. Each sub-network is comprised of a plurality of IEEE-1394-compliant nodes. As one example, nodes 11, 12 and 13 comprise the sub-network 10 and nodes 21 through 24 comprise the sub-network 20. In each sub-network, the IEEE-1394 serial bus is used for interconnecting neighbor nodes through their cable ports. Nodes 11 and 21, which are shown in detail, are wireless (border) nodes for serving as border nodes. Wireless node 11 includes an upper layer chip 15, a network arbitration state machine 16, a wireless port 17 and one or more cable ports 18. Likewise, the wireless node 21 includes an upper layer chip 25, a network arbitration state machine 26, a wireless port 27 and one or more cable ports 28.

In the wireless node 11, for example, the local wireless port 17 receives signals A1 from the arbitration state machine 16 when the upper layer chip 11 or state machine 16 sends a packet to the remote wireless port 27 and sends a signal A2 to the state machine 26 when it receives a signal from the remote wireless port 27. Further, the local wireless port 17 sends a signal A3 to the arbitration state machine 16 for communicating its current port status (i.e., active or disconnect). In a manner similar to the wireless port 17, the local cable ports 18 operate with the state machine 16 and the node 12. Note that if the wireless nodes serve exclusively as a repeater node, it is not necessary to provide the upper layer chip.

Figure 2:
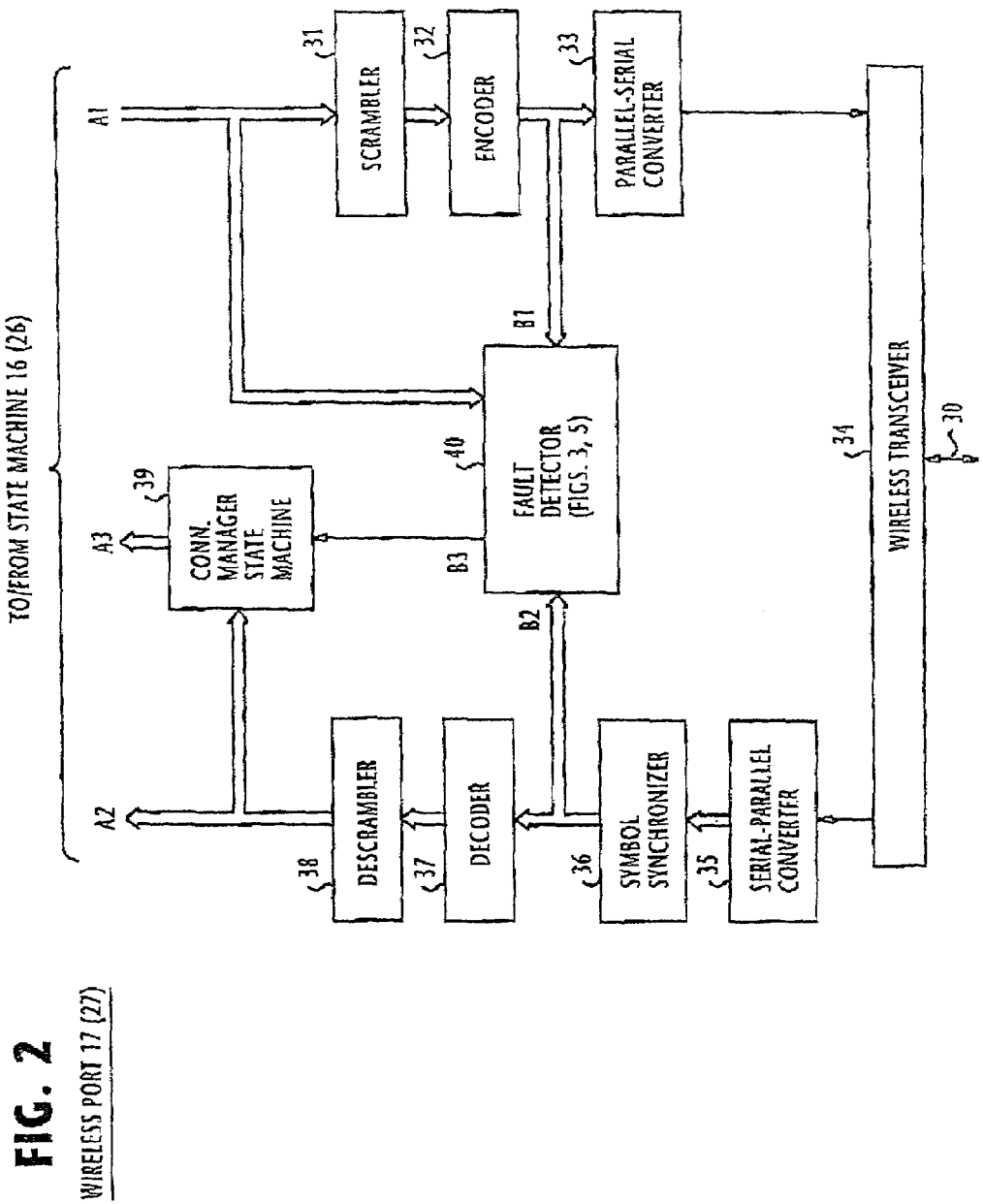
FIG. 2 is a block diagram of a wireless node.

As illustrated in FIG. 2, each of the local wireless port 17 and the remote wireless port 27 is comprised of a scrambler 31 for receiving the signal A1 from the state machine 16, the received signal being scrambled into an 8-bit wide code and encoded by an encoder 32 into a 10-bit-wide block-code symbol B1 according to the 8B10B coding. The symbol B1 is converted in a parallel-to-serial converter 33 to serial form and supplied to a wireless transceiver 34 that interfaces the other wireless port.

Serial data from the wireless transceiver 34 is converted to 10-bit wide parallel signal by a serial-to-parallel converter 35 and boundaries between symbols are detected by a symbol synchronizer 36 to reconstruct a 10-bit-wide block-code symbol B2. The B2 signal is decoded in a 10B8B decoder 37 into an 8-bit wide signal, which is descrambled in a descrambler 38 to recover the 8-bit-wide data signal A2. Data signal A2 is supplied to a connection manager state machine 39 as well as to the arbitration state machine 16 (26). Using the signal A2 from the other sub-network, the connection manager state machine 39 of each wireless port produces the port status signal A3 for application to the arbitration state machine.

Further included in each wireless port is a fault detector 40, which is connected to receive the signals A1, B1 and B2. Fault detector 40 produces a fault indication B3 for communication to the connection manager state machine 39 in the event when the wireless link 30 is interrupted by an obstacle which may be inadvertently placed in the path of the transmitted radio-frequency signal, resulting in reflections that are detected by the wireless transceiver 34. In response to the fault indication signal B3, the connection manager state machine communicates the wireless-link failure event to the arbitration state machine to terminate its arbitration process.

Before the fault detector 40 produces the fault indication signal B3, each of the wireless nodes 11 and 21 operates as follows.

Since the nodes 11 and 21 are substantially identical, discussion of the representative node 11 will suffice, it being understood that the discussion applies to the other node 21 as well.

Figure 3:
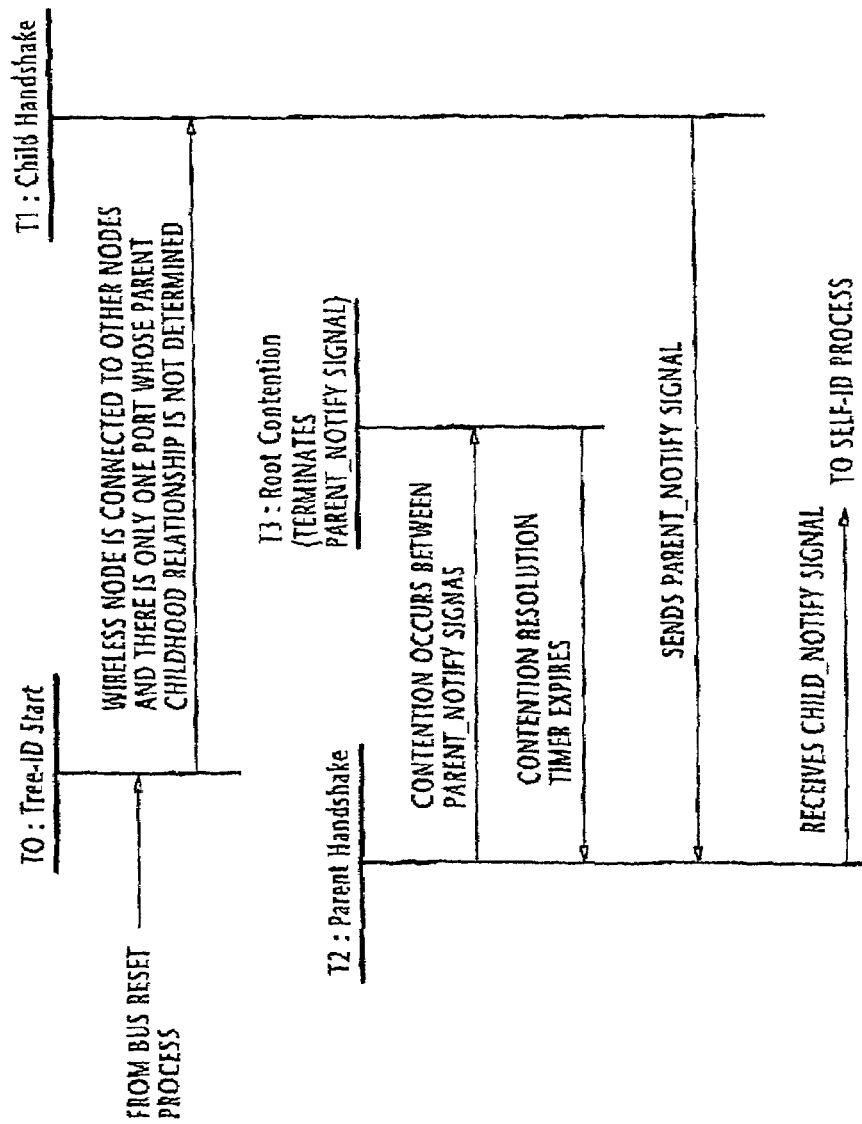
FIG. 3 is a state transition diagram useful for describing the operation of the wireless node when a link failure occurs in a wireless link.

When the wireless link 30 is interrupted during transmission from node 11 to node 21, the receiver node 21 fails to return a response. As a result, the sender node 11 times out and triggers the arbitration state machine 16 to reinitiate the Bus Reset process as specified by the IEEE-1394 standard for reconfiguration of sub-network 10, Simultaneously, the node 11 sends a Bus_Reset signal to the nodes 12 and 13. Following a Bus Reset process, the nodes 12 and 13 enter a Tree ID process to resolve their parent-childhood relationship. Branch node 12 then arbitrates parent-childhood relationship with the wireless node 11. As a result, the wireless node 11 enters the state of T0: Tree ID Start (FIG. 3). Since there is only one port (i.e., node 21) where parent-childhood relationship is yet to be determined, the node 11 changes to state T1: Child Handshake to send a Parent_Notify signal to the wireless node 21 to resolve the parent-childhood relationship, and changes to state T2: Parent Handshake. Since the Parent_Notify signal is reflected off the obstacle in the wireless link 30 and detected by the wireless transceiver 34, the node 11 recognizes that a contention has occurred and changes to state T3: Root Contention to stop sending the Parent_Notify signal and starts a contention resolution timer. When the timer runs out, the wireless node 11 retransmits the Parent_Notify signal again and changes to state T2: Parent Handshake. Since the retransmitted Parent_Notify signal is again detected by the wireless transceiver 34, the wireless node 11 repeats the processes T2 and T3 indefinitely. As a result, a timeout occurs in the nodes 12 and 13. Node 11 responds to this timeout event by reinitiating the Bus Reset process to start over the network initialization. Until the arbitration state machine 16 sends a stop command to the wireless port 17 in response to the fault indication signal B3, the Bus_Reset signal and the Parent_Notify signal are repeatedly transmitted from the wireless node 11, with the former at longer intervals and the latter at shorter intervals.

Figure 4:
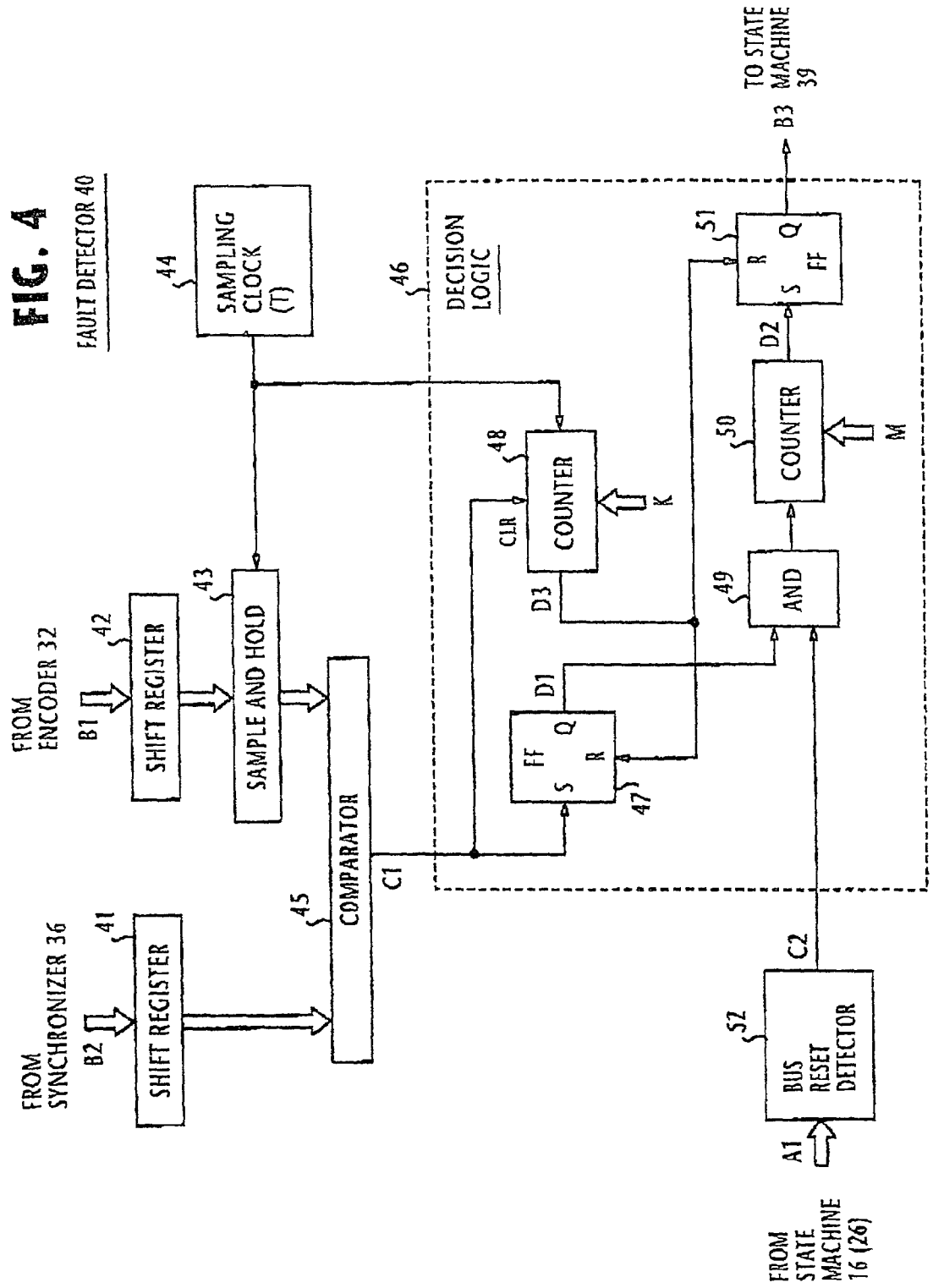
FIG. 4 is a block diagram of a fault detector of the present invention.

FIG. 4 shows one form of the fault detector 40. In this form of fault detector 40, repeatedly transmitted Bus Reset signals are used as an indication of the occurrence of a wireless link failure. Fault detector 40 includes shift register 41 and 42 of identical structure for buffering (N×10) bits of input information, where N is an integer equal to or greater than unity. Shift register 41 receives the 10-bit wide signal B2 from the symbol synchronizer 36 and feeds its (N×10)-bit wide output to a comparator 45. Shift register 42 receives the 10-bit wide signal B1 from the 8B10B encoder 32 and feeds its (N×10)-bit wide output to a sample-and-hold circuit 43. At intervals T, the sample-and-hold circuit 43 samples and holds the (N×10)-bit wide output of shift register 42 in response to a sampling pulse from a sampling clock source 44. The output of sample-and-hold circuit 43 is supplied to the comparator 45 to determine whether it matches the output of shift register 41.

The sampling interval T is greater than the round-trip propagation delay of the signal returning from the obstacle in the wireless link 30. Sampling clock source 44 is triggered in response to a signal B1 from the encoder 32 to produce a sampling pulse. If the wireless transceiver 34 receives a round-trip returning signal within the interval T, the signal stored in the sample-and-hold circuit 43 is an exact copy of its transmitted signal. Therefore, the comparator 45 detects a match between its input signals and produces a coincidence signal C1.

A bus reset detector 52 is provided to analyze the signal A1 from the arbitration state machine 16. When the arbitration state machine 16 is in Bus Reset state and hence a Bus_Reset signal is sent from the wireless port 17, the bus reset detector 52 produces a signal C2. The coincidence signal C1 and the bus-reset indication signal C2 are supplied to a decision logic 46.

In one example, the decision logic 46 is comprised of a flip-flop 47 and a programmable counter 48. The coincidence signal C1 is used to set the flip-flop 47 to produce an output signal D1.

The signals C2 and D1 are coupled to an AND gate 49, the output of which is used to drive a programmable counter 50 which is preset to a count value M. If bus reset indicating signals C2 are consecutively generated during the presence of the signal D1, the AND gate 49 produces output pulses and, in response, the counter 50 increments its count value to produce an output signal D2 when it attains the preset value M. The fault indication signal B3 is produced at the output of a flip-flop 51 when it is set in response to the output signal D2. In order to draw a distinction between fault and normal conditions, the preset value M represents the number of times Bus Reset events may possibly occur in sequence during a wireless link failure and this number is greater than the number of times the same Bus Reset events may possibly occur during normal operation.

The coincidence signal C1 is further applied to the clear terminal of counter 48 to clear its contents to start counting sampling pulses from the clock source 44. Counter 48 is preset with a count value K which corresponds to a release guard time. Hence, the counter 48 produces an output signal D3 when it consecutively counts K sampling pulses and resets the flip-flops 47 and 51.

Note that the sampling interval T depends not only on the distance between the sending wireless port and an obstacle, but also on the transmit/receive power of its transceiver. Since the location of an obstacle is unknown, it is preferable to use the transmit/receive power of the wireless transceiver to determine the sampling interval T.

Figure 5:
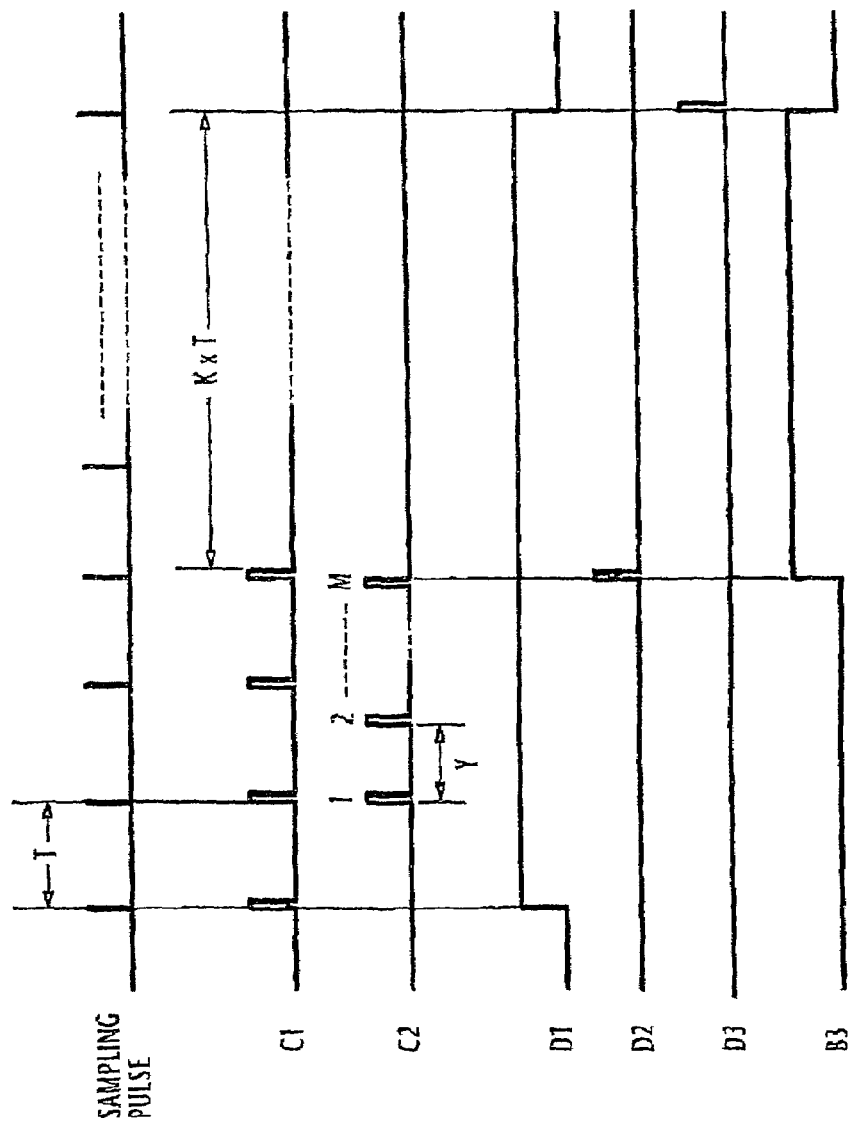
FIG. 5 is a timing diagram for describing the operation of FIG. 4.

The following is a description of the operation of decision logic 46 using a timing diagram shown in FIG. 5.

When a 10-bit symbol B1 is generated by encoder 32 and transmitted from the wireless transceiver 34, the sampling clock source 44 is triggered to start producing sampling pulses at intervals T. If a wireless link failure occurs, the transceiver 34 detects the returning symbol B1 and the comparator 45 produces an output signal C1. If the fault condition persists for a period longer than the interval T, N symbols B1 will be stored in each of the shift registers 41 and 42 at intervals T and the comparator 45 consecutively produces a number of coincidence signals C1. Simultaneously, the arbitration state machine 16 is informed from the wireless port 17 that an interruption has occurred in the wireless link 30, it produces a Bus_Reset signal as described above.

In response to the first coincidence signal C1, the output of flip-flop 47 produces a high-level signal D1, enabling the AND gate 49. Since the interruption of the wireless link persists, the arbitration state machine 16 repeats Bus Reset and Tree ID processes as described above. Thus, the bus reset detector 52 produces its output signals C2 in sequence at intervals Y, where the interval Y corresponds to the total of the time the nodes 12, 13 take to perform a timing action plus the time the state machine 16 needs to complete a Bus Reset process. Since the AND gate 49 is enabled, the counter 50 increments its count and produces a signal D2 when the count value M is reached. In response, the output of flip-flop 51 switches to a high level, producing a fault indicating signal B3.

As will be described later, the fault indicating signal B3 eventually causes the arbitration state machine 16 to terminate its initialization process without performing arbitration between the wireless ports 17 and 27. Therefore, the wireless port 17 ceases producing signals C1 and C2 at the instant the signal B3 is generated.

If coincidence signals C1 do not exist for an interval K×T, the counter 48 produces a signal D3 that resets the flip-flops 47 and 51 to terminate the fault indicating signal B3.

Figure 6:
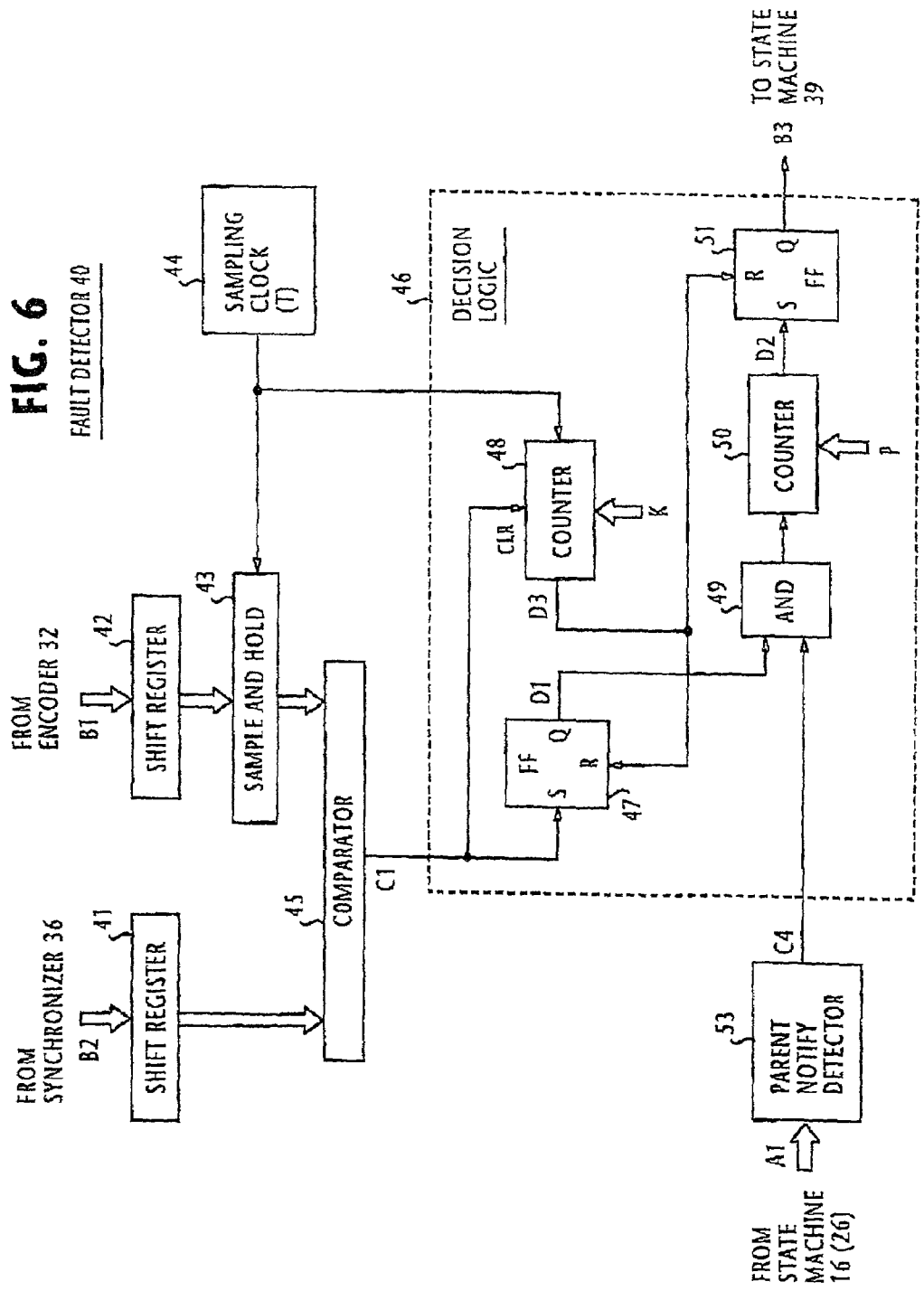
FIG. 6 is a block diagram of a modified fault detector.
Figure 7:
FIG. 7 is a timing diagram for describing the operation of FIG. 6.

A second form of the fault detector 40 is shown in FIG. 6 in which repeatedly transmitted Parent Notify signals are used as an indication of the occurrence of a wireless link failure. Fault detector 40 of FIG. 6 is similar to that of FIG. 4 with the exception that a parent notify detector 53 is used to produce a signal C4, instead of the output signal C2 of bus reset detector 52 of FIG. 4. Further, the counter 50 is preset with a count value P, instead of the value M, that is chosen so that it distinguishes the number of times Parent_Notify signals may possibly occur during a wireless link failure from the number of times they occur during normal operation. Therefore, as illustrated in a timing diagram of FIG. 7, the counter 50 of FIG. 6 produces an output signal D2 when Parent_Notify signals are detected P times in sequence by the parent notify detector 53. Flip-flop 51 generates a fault indicating signal B3 in response to the signal D2 from counter 50 and terminates this signal in response to the output signal D3 of counter 48.

The fault detector of FIG. 6 is particularly advantageous for use in a wireless node where none of its cable ports are connected to other nodes. The reason for this is that the arbitration state machine of such a wireless node is not triggered by timeout events of other nodes when a wireless link failure occurs, and hence it no longer initiates a Bus Reset.

Figure 8:
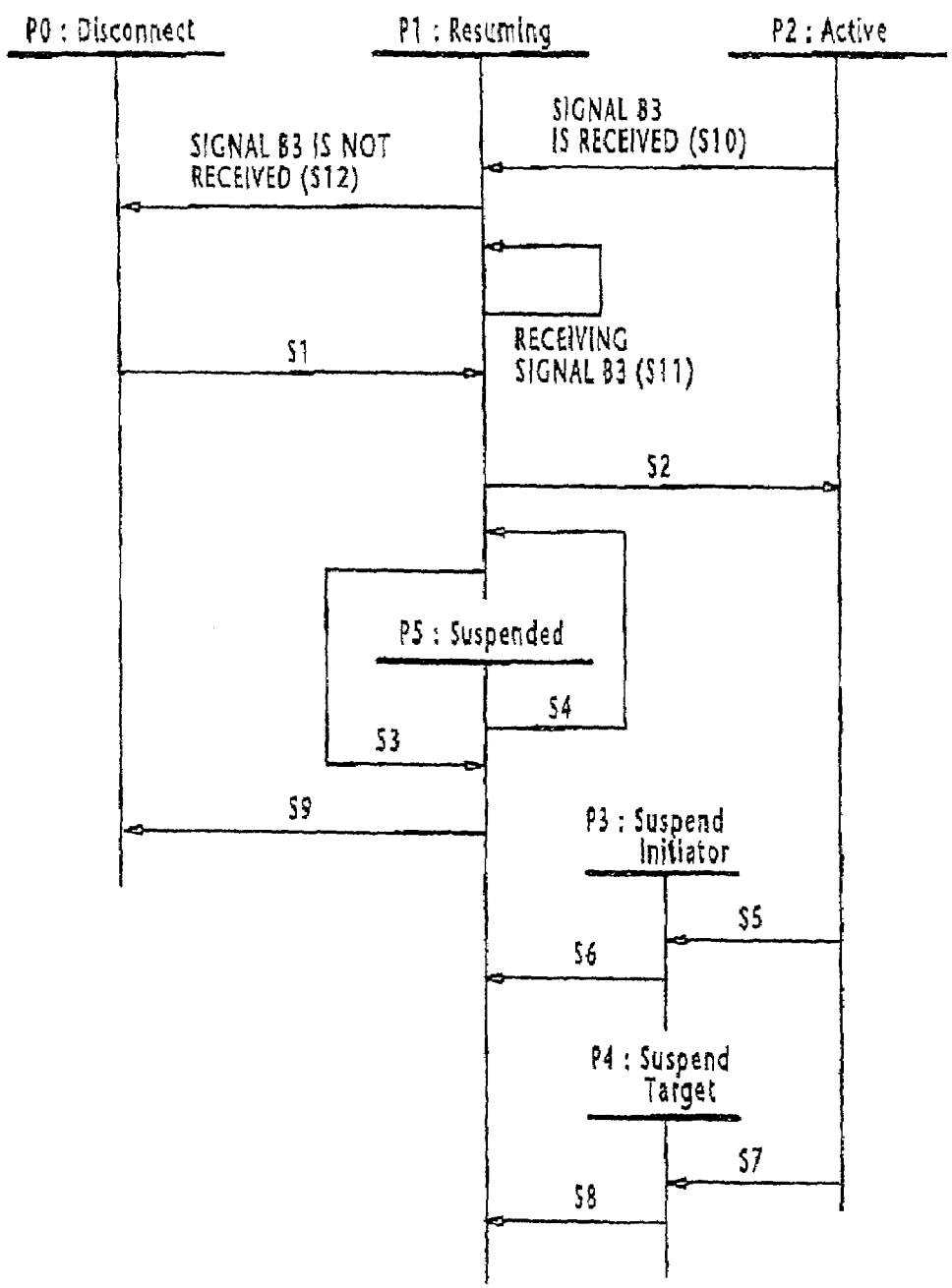
FIG. 8 is a state transition diagram for describing the operation of a connection manager state machine of FIG. 2 when a wireless link failure occurs.

In response to the signal B3 from the fault detector 40 of either FIG. 4 or 6, the connection manager state machine 39 operates according to the state transition diagram of FIG. 8 wherein steps S1 to S9 have been specified by IEEE-1394 standard. In the present invention, steps S10 to S11 are added to allow direct transition from state P2: Active to state P1: Resuming and from state P1 to state P0: Disconnect. Since steps S1 to S9 are standardized and known, the description thereof is omitted for simplicity.

During operation, the connection manager state machine 39 is in state P2: Active, and sets the port status indication A3 to "active". If the state machine 39 receives a signal B3 from the fault detector 40 of either FIG. 4 or 6, it changes from state P2 to state P1 (step S10) and sets the port status indication A3 to "inactive". Arbitration state machine 16 recognizes that the wireless port 17 is inactive, removes this port out of a list of its target nodes that need intialization, and terminates the initialization process without arbitrating the parent-childhood relationship between the wireless ports 17 and 27. As a result, the reconfiguration of sub-network 10 is successfully completed even though the wireless link failure persists. Connection manager state machine 39 remains in state P1 while receiving the fault indicating signal B3 (step S11). When the wireless link failure is cleared, the fault detector 40 terminates the signal B3, the connection manager state machine 39 changes states from P1 to P0 (step S12).

Figure 9:
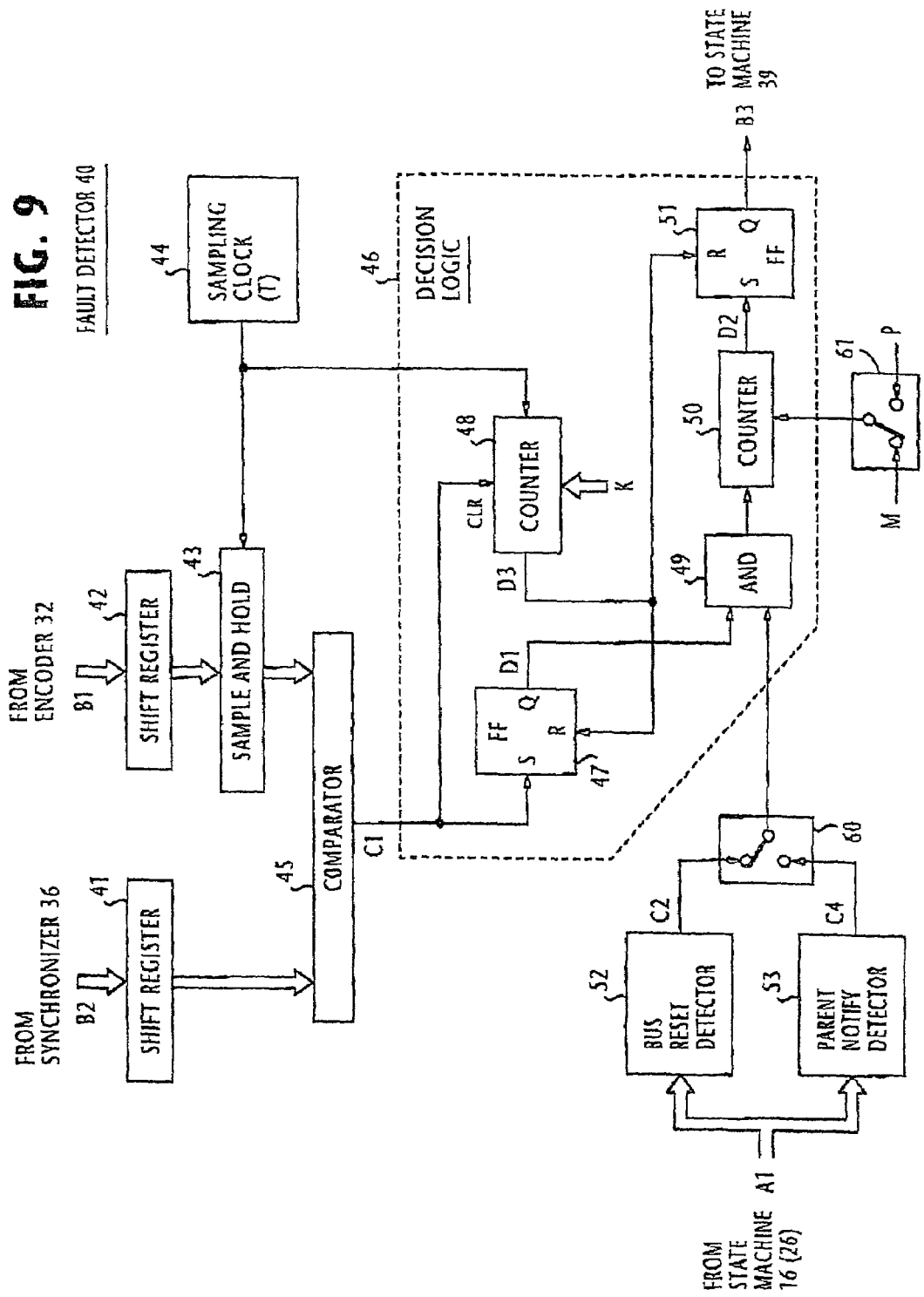
FIG. 9 is a block diagram of a fault detector which combines the features of the fault detectors of FIGS. 4 and 6.

The fault detectors of FIGS. 4 and 6 may be combined as shown in FIG. 9 to selectively use their different features depending on whether or not the cable ports of the wireless (border) node are connected to other nodes. In the combined form, switches 60 and 61 are provided. Switch 60 connects the output of the bus reset detector 52 or parent notify detector 53 to the AND gate 49 and the switch 61 supplies the preset value M to the counter 50 when the bus reset detector 52 is connected to the AND gate 49 or the preset value P to that counter when the parent notify detector 53 is connected to the AND gate 49. Bus reset detector 52 and the preset value M are used when the cable ports of the wireless node are connected to other nodes. Parent notify detector 53 and the preset value P are selected when none of its cable ports are connected to other nodes.

While mention has been made of a wireless link failure, the present invention could equally be as well used for a network in which the border nodes 11 and 21 are interconnected by an optical link.

Figure 10:
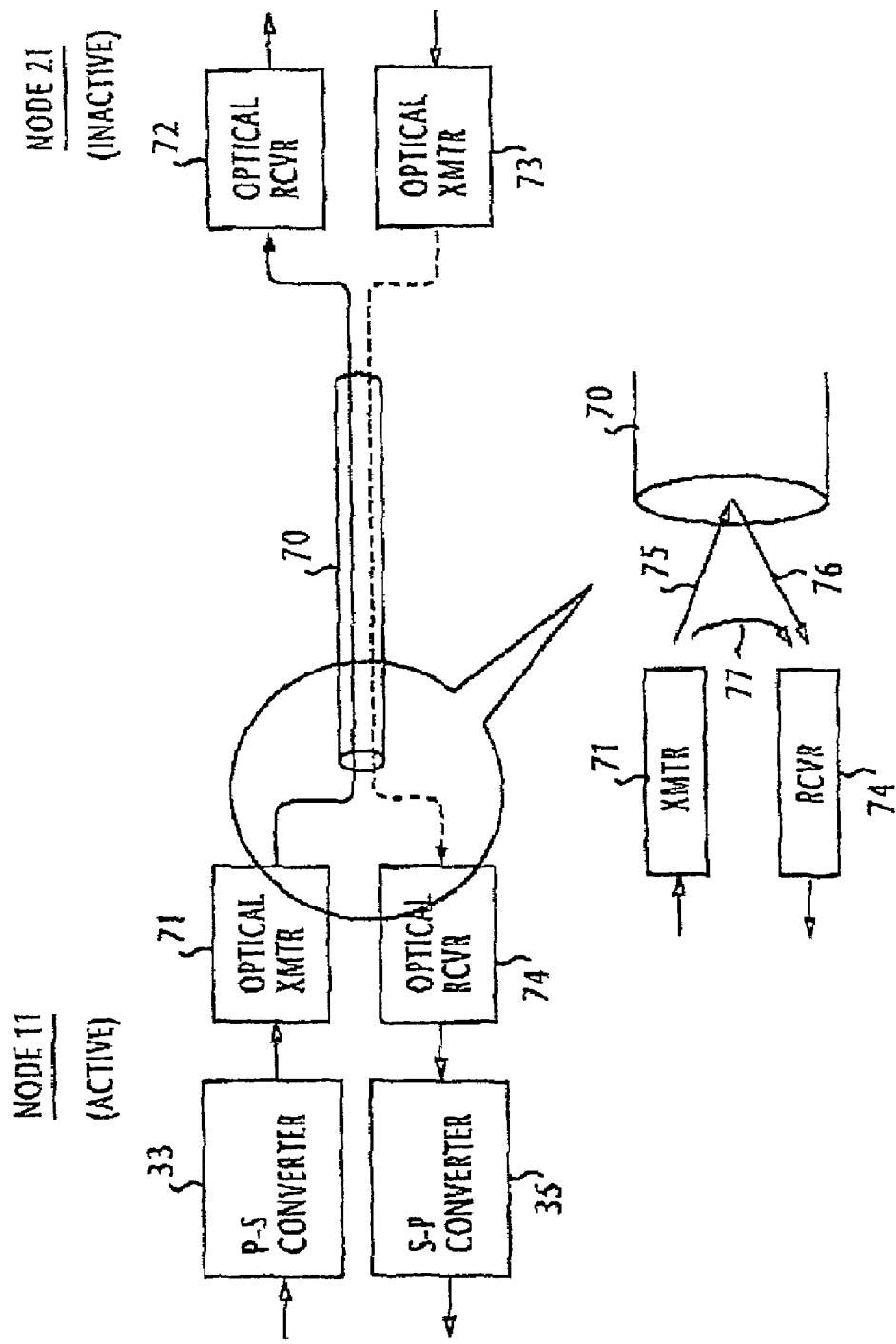
FIG. 10 is a block diagram of an optical system linking two nodes of a serial bus network.

As illustrated in FIG. 10, optical border nodes 11 and 21 are interconnected through an optical link 70. The electrical output signal of parallel-to-serial converter 33 is converted to an optical signal by an optical transmitter (such as light emitting diode or laser diode) 71 and directed to one end of the optical link 70, through which the optical signal propagates to the node 21 and received by an optical receiver 72 (such as photodiode). Optical signal of node 21 is transmitted from optical transmitter 73 and launched into the optical link 70 and propagates to the node 11 through the link and illuminates an optical receiver 74 where the signal is converted to electrical signal that feeds the serial-to-parallel converter 35.

If the node 11 is active and the node 21 is inactive, no signals propagate through the optical link 70 from nodes 21 to 11. Under this condition, the optical signal from transmitter 71, as indicated at 75, is reflected off the proximal end of optical link 70, producing a returning signal 76 which is detected by the optical receiver 74. The output of optical transmitter 71 may also be coupled to the input of optical receiver 74 through a sneak path 77. When this occurs, the fault detector 40 responds to the reflecting signal by producing a fault indicating signal B3 and the node 11 instantly stops initialization process.

It is desirable to allow the user to identify the cause of a network failure. An alarm system, not shown, is preferably provided in the nodes 11 and 21 to respond to the fault indicating signal B3 by indicating a warning message on a display, illuminating an LED alarm lamp or producing an alarm sound.

What is claimed is:

1. A network device for communicating with a remote device, wherein the network device includes a transceiver for transmitting a signal to, and receiving a signal from, said remote device, characterized by:
   a fault detector for detecting a predetermined state of said network device and a coincidence between transmitted signal and received signal indicating that the received signal is a copy of the transmitted signal, and producing a fault indicating signal if said predetermined state and said coincidence are simultaneously detected; and
   means for removing said predetermined state in response to said fault indicating signal.

2. The network device of claim 1, wherein said fault detector comprises:
   a holding circuit for storing said transmitted signal for a predetermined interval;
   a comparator for making a comparison between the received signal and the stored transmitted signal;
   a state detector for detecting when said network device is in an initialization state; and
   a decision circuit for producing said fault indicating signal based on output signals from said comparator and said state detector.

3. The network device of claim 2, wherein said initialization state detected by the state detector is a Bus_Reset signal specified by IEEE-1394 standard, further comprising:
   a second state detector for detecting a Parent_Notify signal specified by said standard; and
   means for selectively coupling output signals of the first-mentioned state detector and said second state detector to said decision circuit depending on whether or not said network device is connected to other network device.

4. The network device of claim 2, wherein said decision circuit produces said fault indicating signal when said state detector is repeatedly detecting initialization signals of said network device a predetermined number of times and said comparator is continuously producing a coincidence signal indicating that the received signal is a copy of the transmitted signal.

5. The network device of claim 4, wherein said initialization signals are command signals for directing said remote device to perform initialization.

6. The network device of claim 5, wherein said initialization signals are Bus_Reset signals specified by IEEE-1394 standard.

7. The network device of claim 4, wherein said initialization signals are arbitration signals for arbitrating with said remote device.

8. The network device of claim 7, wherein said initialization signals are Parent_Notify signals specified by IEEE-1394 standard.

9. The network device of claim 1, further comprising a connection manager state machine for providing management of communicating states of said network device, said state machine being responsive to said fault indicating signal for changing said communicating states.

10. The network device of claim 9, wherein said state machine is responsive to said fault indicating signal for controlling said network device to change from an active state to an inactive state.

11. The network device of claim 10, wherein said active state is state P2 Active specified by IEEE-1394 standard and said inactive state is state P1 Resuming specified by IEEE-1394 standard.

12. The network device of claim 1, further comprising a state machine for producing said signal transmitted from said transceiver depending on an operating state of the network device and receiving said signal received by said transceiver, wherein said fault detector comprises:
   a first monitor circuit for monitoring said transceiver to detect a coincidence between a signal transmitted from the transceiver and a signal received by the transceiver, said coincidence indicating that the received signal is a copy of the transmitted signal;
   a second monitor circuit for monitoring operating states of said state machine to detect a predetermined state; and
   a decision circuit for producing a fault indicating signal if said predetermined state and said coincidence are simultaneously detected by said first and second monitor circuits.

13. The network node of claim 1, wherein said transceiver is a wireless transceiver.

14. The network node of claim 1, wherein said transceiver is an optical transceiver connected to an optical link.

15. A fault detector for a network device, comprising:
   a first monitor circuit for monitoring a signal transmitted from the network device to a wireless or optical link and a signal received by the network device from the link for detecting a coincidence between the transmitted signal and the received signals, said coincidence indicating that the received signal is a copy of the transmitted signal;
   a second monitor circuit for monitoring operation of said network device and detecting a predetermined state of said network device which would persist indefinitely during a link failure; and
   a decision circuit for producing a fault indicating signal when said predetermined state and said coincidence are simultaneously detected.

16. The fault detector of claim 15, wherein the network device includes a state machine for controlling operating states of said network device, and a transceiver connected to said state machine, wherein said first monitor circuit monitors said transceiver to detect a coincidence between a signal transmitted from the transceiver and a signal received by the transceiver, said coincidence indicating that the received signal is a copy of the transmitted signal, and said second monitor circuit monitors said state machine to detect said predetermined state of said network device.

17. The fault detector of claim 16, wherein said second monitor circuit detects a second predetermined state of said node, further comprising means for selecting the first-mentioned predetermined state or the second predetermined state depending on whether said node is connected to another node, and wherein said decision circuit produces said fault indicating signal based on the selected state.

18. A method of communication via a wireless or optical link, comprising the steps of:
   a) transmitting, from a network device, a signal to and receiving a signal from said link;
   b) monitoring transmitted signal and received signal for detecting when a signal received from the link is a copy of the transmitted signal;
   c) detecting a predetermined state of said network device which would persist indefinitely during a link failure; and
   d) if said copy of the transmitted signal is detected by step (b) simultaneously with the detection of said predetermined state by step (c), controlling said network device to change from said predetermined state to a normal state.

19. The method of claim 18, further comprising the steps of:
   performing a management of communicating states of the network device; and
   altering said communicating states in response to said fault indicating signal.

20. The method of claim 18, wherein the step (b) comprises storing said transmitted signal for a predetermined interval and making a comparison between the received signal and the stored transmitted signal,
   wherein the step (c) comprises detecting when said network device is in an initialization state, and
   wherein the step (d) comprises controlling said network device based on a result of said comparison when said initialization state is simultaneously detected.

21. A method of detecting a failure in a wireless or optical link interconnecting network nodes, at least one of the network nodes including a state machine for controlling operating states of said at least one of the network nodes, and a transceiver connected to said state machine, comprising:
   monitoring said transceiver with a first monitoring circuit to detect a coincidence between a signal transmitted from the transceiver and a signal received by the transceiver, said coincidence indicating that the received signal is a copy of the transmitted signal;
   monitoring said state machine with a second monitoring circuit to detect a predetermined state of said at least one of the network nodes; and
   producing a fault indicating signal if said predetermined state and said coincidence are simultaneously detected by said first and second monitoring circuits.

* * * * *